United States Patent
Gider et al.

(10) Patent No.: US 8,331,058 B2
(45) Date of Patent: Dec. 11, 2012

(54) METHOD AND APPARATUS FOR PROVIDING A WRITE HEAD WITH AN IMPROVED POLE TIP TO IMPROVE OVERWRITE AND/OR ADJACENT TRACK INTERFERENCE

(75) Inventors: Savas Gider, San Jose, CA (US); Wen-Chien David Hsiao, San Jose, CA (US); Quan-chiu Harry Lam, San Jose, CA (US); Terence Tin-Lok Lam, Cupertino, CA (US); Edward Hin Pong Lee, San Jose, CA (US); Yansheng Luo, Fremont, CA (US); Vladimir Nikitin, Campbell, CA (US); Changqing Shi, San Jose, CA (US); Xiaoyu Sui, Fremont, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1210 days.

(21) Appl. No.: 10/857,363

(22) Filed: May 28, 2004

(65) Prior Publication Data
US 2005/0264930 A1    Dec. 1, 2005

(51) Int. Cl.
   *G11B 5/127* (2006.01)
(52) U.S. Cl. ........... 360/125.14; 360/125.2; 360/125.52; 360/125.65

(58) Field of Classification Search ........... 360/122, 360/125, 126, 127, 125.01–125.03, 125.13–125.15, 360/125.19–125.21, 125.51–125.53, 125.64–125.66
See application file for complete search history.

(56) References Cited

U.S. PATENT DOCUMENTS

| | | | | |
|---|---|---|---|---|
| 4,295,173 | A | 10/1981 | Romankiw et al. | 360/125 |
| 4,885,649 | A | 12/1989 | Das | 360/113 |
| 5,208,715 | A | 5/1993 | Mowry | 360/113 |
| 5,245,493 | A | 9/1993 | Kawabe et al. | 360/126 |
| 5,276,579 | A | 1/1994 | Takamori | 360/126 |
| 5,600,519 | A | 2/1997 | Heim et al. | 360/126 |
| 5,802,700 | A * | 9/1998 | Chen et al. | 29/603.14 |
| 6,122,144 | A * | 9/2000 | Chang et al. | 360/122 |
| 6,134,080 | A * | 10/2000 | Chang et al. | 360/126 |
| 6,381,093 | B2 | 4/2002 | Yoshida et al. | 360/126 |
| 7,508,628 | B2 * | 3/2009 | Che et al. | 360/125.16 |
| 2001/0050830 | A1 * | 12/2001 | Otsuka et al. | 360/125 |
| 2002/0093763 | A1 | 7/2002 | Sato et al. | 360/126 |
| 2003/0021064 | A1 * | 1/2003 | Ohtomo et al. | 360/126 |
| 2003/0048581 | A1 | 3/2003 | Ohtomo et al. | 360/126 |
| 2003/0053251 | A1 * | 3/2003 | Yoshida et al. | 360/126 |

FOREIGN PATENT DOCUMENTS

| | | |
|---|---|---|
| JP | 04-302810 | 10/1992 |
| JP | 07296328 A * | 11/1995 |

\* cited by examiner

*Primary Examiner* — Brian Miller
(74) *Attorney, Agent, or Firm* — Merchant & Gould

(57) ABSTRACT

A method and apparatus for providing a write head with an improved pole tip to improve overwrite and/or adjacent track interference. A cross pole tip writer is provided with a shape that is designed to reduce the saturation on the pole tip and aid in the concentration of flux to the down track.

28 Claims, 7 Drawing Sheets

METHOD AND APPARATUS FOR PROVIDING A WRITE HEAD WITH AN IMPROVED POLE TIP TO IMPROVE OVERWRITE AND/OR ADJACENT TRACK INTERFERENCE

BACKGROUND OF THE INVENTION

1. Field of the Invention

This disclosure relates in general to magnetic storage systems, and more particularly to a method and apparatus for providing a write head with an improved pole tip to improve overwrite and/or adjacent track interference (OW/ATI).

2. Description of Related Art

There has been huge progress in the field of magnetic storage system technology in almost 50 years. Moreover, the rate of this progress is increasing year after year. Such success has made storage systems an important component of modern computers.

Some of the most important customer attributes of any storage system are the cost per megabyte, data rate, and access time. In order to obtain the relatively low cost of today's storage system compared to solid state memory, the customer must accept the less desirable features of this technology, which include a relatively slow response, high power consumption, noise, and the poorer reliability attributes associated with any mechanical system. On the other hand, magnetic storage systems have always been nonvolatile; i.e., no power is required to preserve the data, an attribute which in semiconductor devices often requires compromises in processing complexity, power-supply requirements, writing data rate, or cost.

Improvements in areal density have been the chief driving force behind the historic improvement in storage cost. In fact, the areal density of magnetic storage systems continues to increase. While nature allows us to scale down the size of each bit of information, it does not allow scaling to happen forever.

Today, as the magnetic particles that make up recorded data on a storage system become ever smaller, technical difficulties in writing and reading such small bits occur. Further, as areal density increases, the requirements put on head designs will change.

In a magnetic head, a read element and a write element are formed having an air bearing surface ABS, in a plane, which can be aligned to face the surface of the magnetic disk. The read element includes a first shield, a second shield, and a read sensor that is located within a dielectric medium between the first shield and the second shield. The most common type of read sensor 48 used in the read/write head 28 is the magnetoresistive (AMR or GMR) sensor, which is used to detect magnetic field signal changes in a magnetic medium by means of changes in the resistance of the read sensor imparted from the changing magnitude and direction of the magnetic field being sensed.

The write element is typically an inductive write element that includes the second shield that functions as a first pole for the write element and a second pole disposed above the first pole. The first pole and the second pole contact one another at a backgap portion, with these three elements collectively forming the yoke. The combination of a first pole tip portion and a second pole tip portion near the ABS are sometimes referred to as the ABS end 56 of the write element. Some write elements have included a pedestal that can be used to help define track width and throat height. A write gap is formed between the first and second poles in the area opposite the back gap portion. The write gap is typically filled with a non-magnetic, electrically insulating material that forms a write gap material layer. A conductive coil passes through the yoke. The write head operates by passing a writing current through the conductive coil. Because of the magnetic properties of the yoke, a magnetic flux is induced in the first and second poles by write currents passed through the coil. The write gap allows the magnetic flux to fringe out from the yoke thus forming a fringing gap field and to cross the magnetic recording medium that is placed near the ABS.

Areal density, also sometimes called bit density, refers to the amount of data that can be stored in a given amount of hard disk platter "real estate". Since disk platters surfaces are of course two-dimensional, areal density is a measure of the number of bits that can be stored in a unit of area. It is usually expressed in bits per square inch (BPSI). Average minimum track spacing (or "ATS") is a measure of how close adjacent data tracks can be positioned to one another for a particular data head without degrading the position error margin. If the head is too wide due to manufacturing tolerances, the position error margin may be insufficient as a result of the head having an ATS value that is greater than the product track "pitch". Track pitch is the actual distance between adjacent track centers. The "average" minimum track spacing is the average of the minimum calculated track spacing intercepts to the right and to the left of the ideal track position. There is a desire to constrain the average minimum track spacing for each data head to be less than the product track pitch.

Overwrite capability is the capability of the data head to write new data over previously written data on the disc surface. There is a desire to maximize the overwrite capability to minimize the previously written data's effect on the newly written data. Overwrite capability is measured by comparing the frequency content of an original data signal with the frequency content of the data signal after an overwrite condition involving a different write signal frequency.

Manufacturing tolerances incurred during the fabrication process of the data head may have adverse effects on the error rate performance. These manufacturing tolerances may result in pole tip saturation problems and marginally wide head situations, among other performance problems. Pole tip saturation occurs in the data head during write operations when additional magnetic field applied to the head results in no further increase in the data head's magnetization at the gap edge of the trailing pole tip. As a result, the media is recorded with a more gradually changing magnetic field which produces a more gradual transition in the media that is later transduced by the head in a read mode to form a broader pulse than usual. Broad pulses are more likely to cause errors in the read operation. Data heads having relatively short throat lengths are more likely to experience pole tip saturation than data heads having relatively long throat lengths.

Manufacturing tolerances also affect the effective width of the data head. If the data head is too wide, the magnetic field generated during write operations may adversely affect the data written on adjacent data tracks. During read operations, the data read from the disc surface by a wide head may be corrupted by adjacent track interference. If the data head is too narrow, the read signal amplitude may be too small. This adversely affects position error margin. In other words, the data head cannot get very far off track without creating an unacceptable level of bit errors in the data read from the data track.

Current recording heads are approaching a Track Per Inch (TPI) Density larger than 100K. The presents a technological challenge in balancing the overwrite and the adjacent track interference. Another challenge is the aspect ratio of the flare length/P2B is getting larger, which degrades the stress anisotropic and lowers the permeability of the pole tip. However, simply reducing flare length runs the risk of over saturating the pole tip.

It can be seen then that there is a need for a method and apparatus for providing a write head with an improved pole tip to improve overwrite and/or adjacent track interference.

FIG. 1 illustrates an exemplary storage system 100 according to the present invention. A transducer 110 is under control of an actuator 120, whereby the actuator 120 controls the position of the transducer 110. The transducer 110 writes and reads data on magnetic media 130. The read/write signals are passed to a data channel 140. A signal processor 150 controls the actuator 120 and processes the signals of the data channel 140 for data exchange with external Input/Output (I/O) 170. I/O 170 may provide, for example, data and control conduits for a desktop computing application, which utilizes storage system 100. In addition, a media translator 160 is controlled by the signal processor 150 to cause the magnetic media 130 to move relative to the transducer 110. The present invention is not meant to be limited to a particular type of storage system 100 or to the type of media 130 used in the storage system 100.

FIG. 2 illustrates one particular embodiment of a multiple magnetic disk storage system 200 according to the present invention. In FIG. 2, a hard disk drive storage system 200 is shown. The system 200 includes a spindle 210 that supports and rotates multiple magnetic disks 220. The spindle 210 is rotated by motor 280 that is controlled by motor controller 230. A combined read and write magnetic head 270 is mounted on slider 260 that is supported by suspension 250 and actuator arm 240. Processing circuitry exchanges signals that represent information with read/write magnetic head 270, provides motor drive signals for rotating the magnetic disks 220, and provides control signals for moving the slider 260 to various tracks. Although a multiple magnetic disk storage system is illustrated, a single magnetic disk storage system is equally viable in accordance with the present invention.

The suspension 250 and actuator arm 240 position the slider 260 so that read/write magnetic head 270 is in a transducing relationship with a surface of magnetic disk 220. When the magnetic disk 220 is rotated by motor 280, the slider 240 is supported on a thin cushion of air (air bearing) between the surface of disk 220 and the ABS 290. Read/write magnetic head 270 may then be employed for writing information to multiple circular tracks on the surface of magnetic disk 220, as well as for reading information therefrom.

FIG. 3 illustrates a sensor assembly 300. In FIG. 3, a slider 320 is mounted on a suspension 322. First and second solder connections 302 and 308 connect leads from the sensor 318 to leads 310 and 314, respectively, on suspension 322 and third and fourth solder connections 304 and 306 connect to the write coil (not shown) to leads 312 and 316, respectively, on suspension 322.

FIG. 4 is an ABS view of slider 400 and magnetic head 410. The slider has a center rail 420 that supports the magnetic head 410, and side rails 430 and 460. The support rails 420, 430 and 460 extend from a cross rail 440. With respect to rotation of a magnetic disk, the cross rail 440 is at a leading edge 450 of slider 400 and the magnetic head 410 is at a trailing edge 470 of slider 400.

The above description of a typical magnetic recording disk drive system, shown in the accompanying FIGS. 1-4, is for presentation purposes only. Storage systems may contain a large number of recording media and actuators, and each actuator may support a number of sliders. In addition, instead of an air-bearing slider, the head carrier may be one that maintains the head in contact or near contact with the disk, such as in liquid bearing and other contact and near-contact recording disk drives.

FIG. 5 is a side cross-sectional elevation view of a magnetic head 540. Note that FIG. 5 does not show the details of the pole tip region. The magnetic head 540 includes a write head portion 570 and a read head portion 572. The read head portion 572 includes a sensor 574. FIG. 6 is an ABS view of the magnetic head of FIG. 5. The sensor 574 is sandwiched between first and second gap layers 576 and 578, and the gap layers are sandwiched between first and second shield layers 580 and 582.

In a piggyback head as shown in FIG. 5, the second shield layer (S2) 582 and the first pole piece (P1) 592 are separate layers. The first and second shield layers 580 and 582 protect the MR sensor element 574 from adjacent magnetic fields. More conventionally, the second shield 582 also functions as the first pole (P1) 592 of the write element, giving rise to the term "merged MR head." However, the present invention is not meant to be limited to a particular type of MR head.

In response to external magnetic fields, the resistance of the sensor 574 changes. A sense current Is conducted through the sensor causes these resistance changes to be manifested as voltage changes. These voltage changes are then processed as readback signals by the signal processing system 350 shown in FIG. 3.

The write head portion of the magnetic head includes a coil layer 584 sandwiched between first and second insulation layers 586 and 588. A third insulation layer 590 may be employed for planarizing the head to eliminate ripples in the second insulation layer caused by the coil layer 584. An insulation layer 542 is formed over the second pole piece layer 594. The first, second and third insulation layers are referred to in the art as an "insulation stack." The coil layer 584 and the first, second and third insulation layers 586, 588 and 590 are sandwiched between first and second pole piece layers 592 and 594. The first and second pole piece layers 592 and 594 are magnetically coupled at a back gap 596 and have first and second pole tips 598 and 501 which are separated by a write gap layer 502 at the ABS 548. The first pole piece layer 592 is separated from the second shield layer 582 by an insulation layer 503.

FIG. 7 illustrates a view of the connect leads 520, 522 coupled to the coil 584 for the write pole piece 594. As shown in FIGS. 4-7, first and second solder connections 404 and 406 connect leads from the sensor 574 to leads 412 and 414 on the suspension 444, and third and fourth solder connections 416 and 418 connect leads 520 and 522 from the coil 584 (see FIG. 7) to leads 424 and 426 on the suspension.

SUMMARY OF THE INVENTION

To overcome the limitations described above, and to overcome other limitations that will become apparent upon reading and understanding the present specification, the present invention discloses a method and apparatus for providing a write head with an improved pole tip to improve overwrite and/or adjacent track interference.

The present invention solves the above-described problems by providing a cross pole tip writer that reduces the saturation on the pole tip and aids in the concentration of flux to the down track.

A write head in accordance with the principles of the present invention includes a first write pole, a second write pole and a write gap formed between the first and second write poles, wherein at least one of the first and second write poles includes a cross-shaped structure disposed proximate an air bearing surface.

In another embodiment of the present invention, a magnetic storage system is provided. The magnetic storage system includes a magnetic storage medium having a plurality of tracks for recording of data and a magnetic sensor maintained in a closely spaced position relative to the magnetic storage medium during relative motion between the magnetic sensor and the magnetic storage medium, the magnetic sensor further including a write head including a first write pole, a second write pole and a write gap formed between the first and second write poles, wherein at least one of the first and second write poles includes a cross-shaped structure disposed proximate an air bearing surface.

In another embodiment of the present invention, a method for providing a write head with an improved pole tip to improve overwrite and/or adjacent track interference is provided. The method includes forming, about a write gap, a write pole for a write head and shaping the write pole to include a cross-shaped structure for improving overwrite and/or adjacent track interference.

In another embodiment of the present invention, another write head is provided. This write head includes first write means, second write means and means for providing a write gap between the first and second write means, wherein at least one of the first and second write means includes a means for reducing a fringing field and providing a desired overwrite.

In another embodiment of the present invention, another magnetic storage system is provided. This magnetic storage system includes means for storing data and means, maintained in a closely spaced position relative to the means for storing, for reading and writing data on the means for storing during relative motion between the means for reading and writing data and the means for storing data, the means for reading and writing further including means for writing data on the head and means, coupled to the means for writing data, for providing a magnetic gap, wherein the means for writing includes means for reducing a fringing field and providing a desired overwrite.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides method and apparatus for providing a write head with an improved pole tip to improve overwrite and/or adjacent track interference. The present invention provides a cross pole tip writer is provided with a shape that is designed to reduce the saturation on the pole tip and aid in the concentration of flux to the down track.

Figure 1:
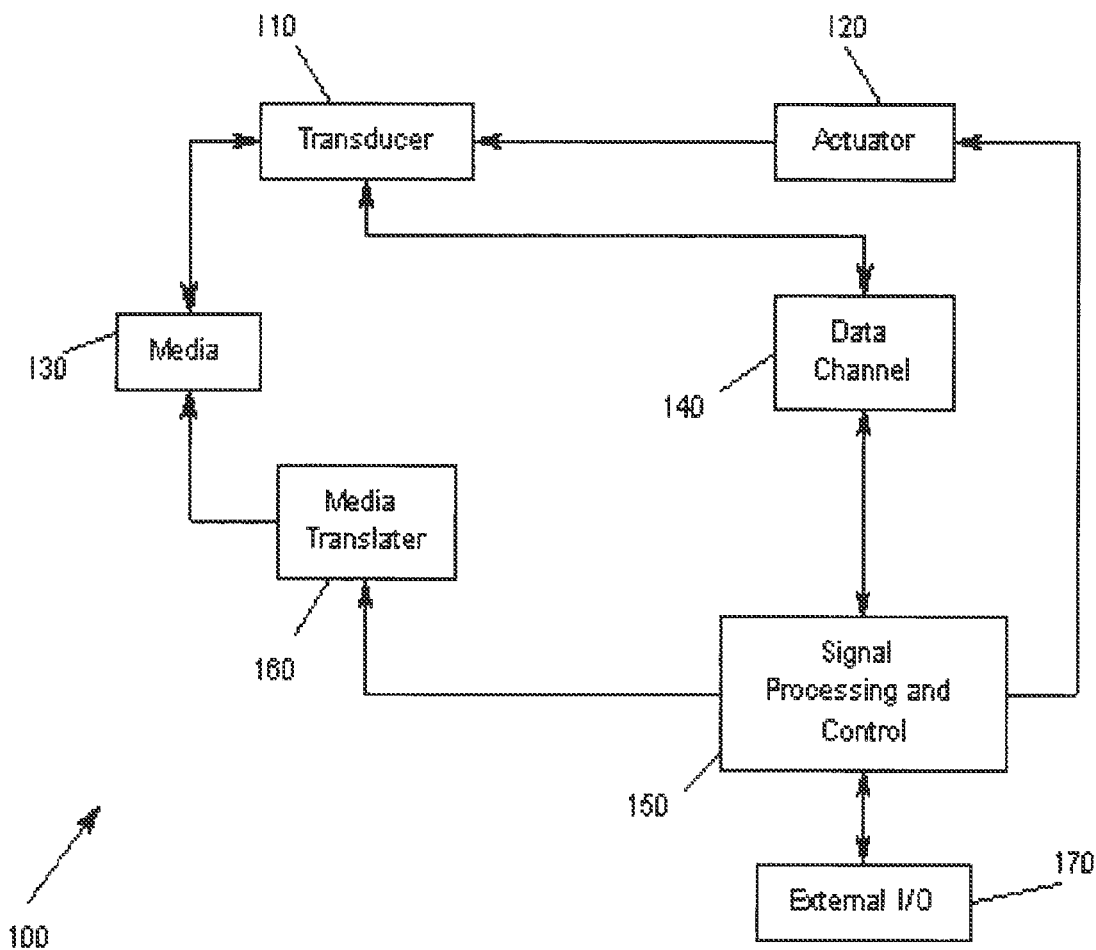
FIG. 1 illustrates a storage system according to an embodiment of the present invention.
Figure 2:
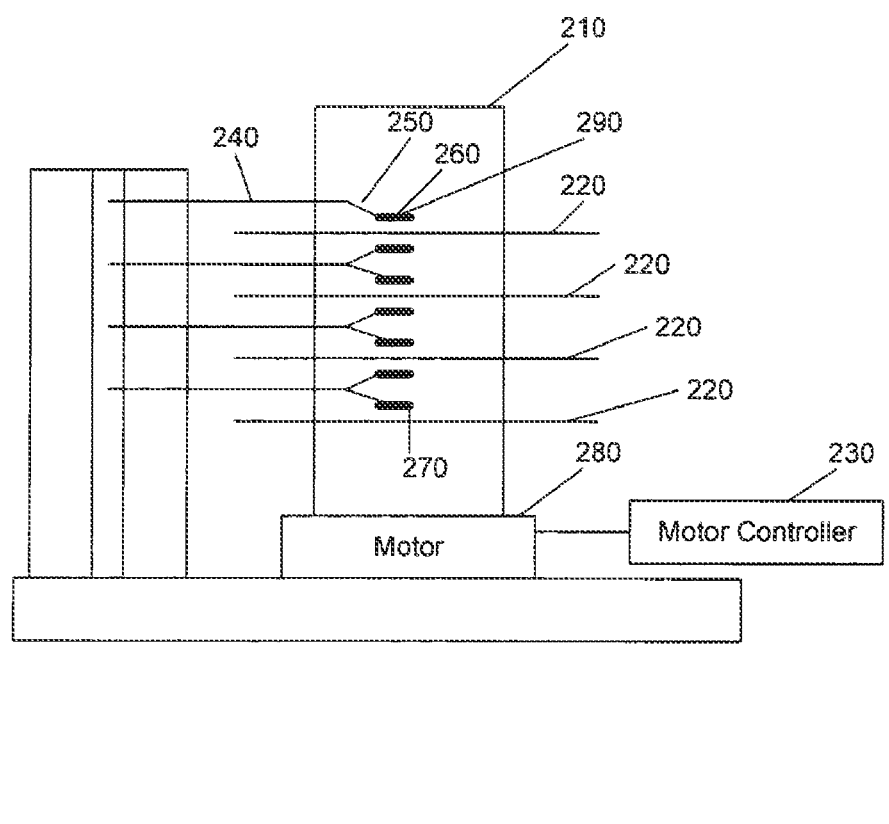
FIG. 2 illustrates one storage system according to an embodiment of the present invention.
Figure 3:
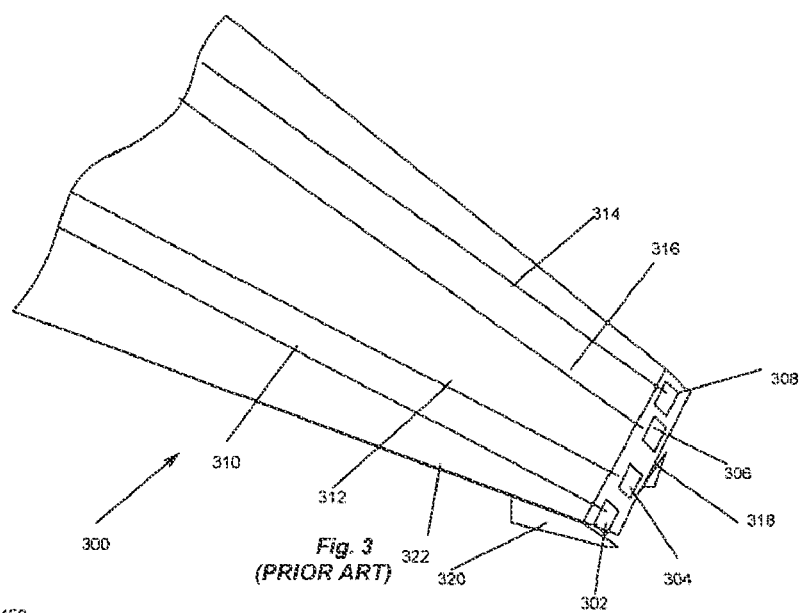
FIG. 3 illustrates a slider mounted on a suspension according to an embodiment of the present invention.
Figure 4:
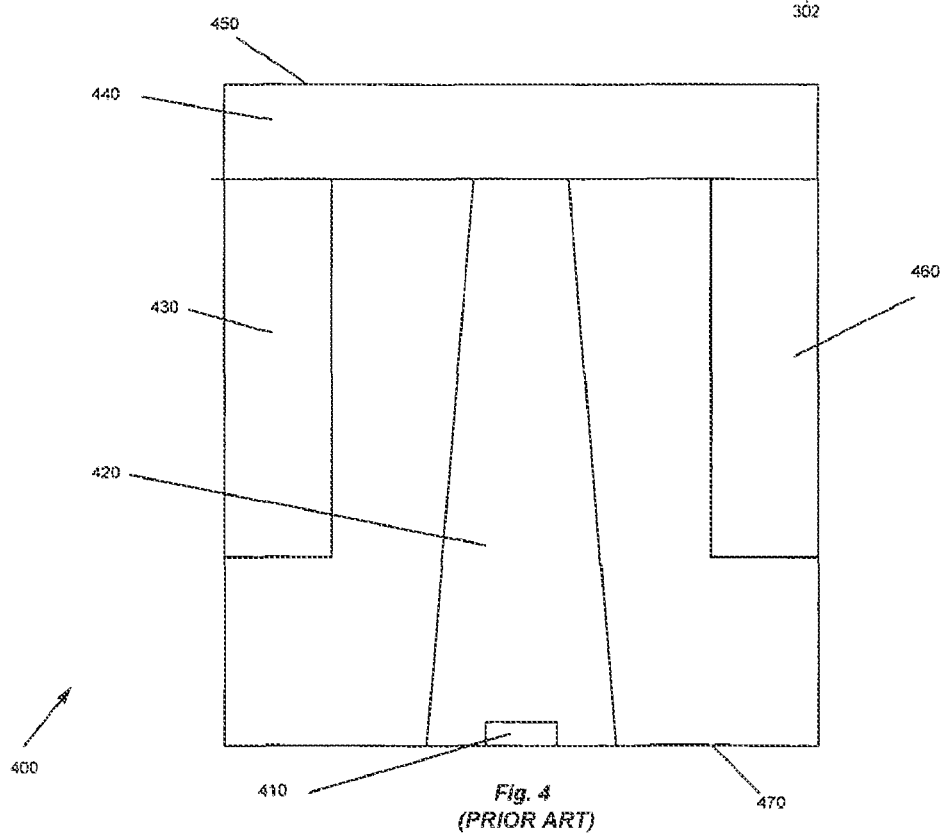
FIG. 4 illustrates an ABS view of the slider and the magnetic head according to an embodiment of the present invention.
Figures 5, 6, 7:
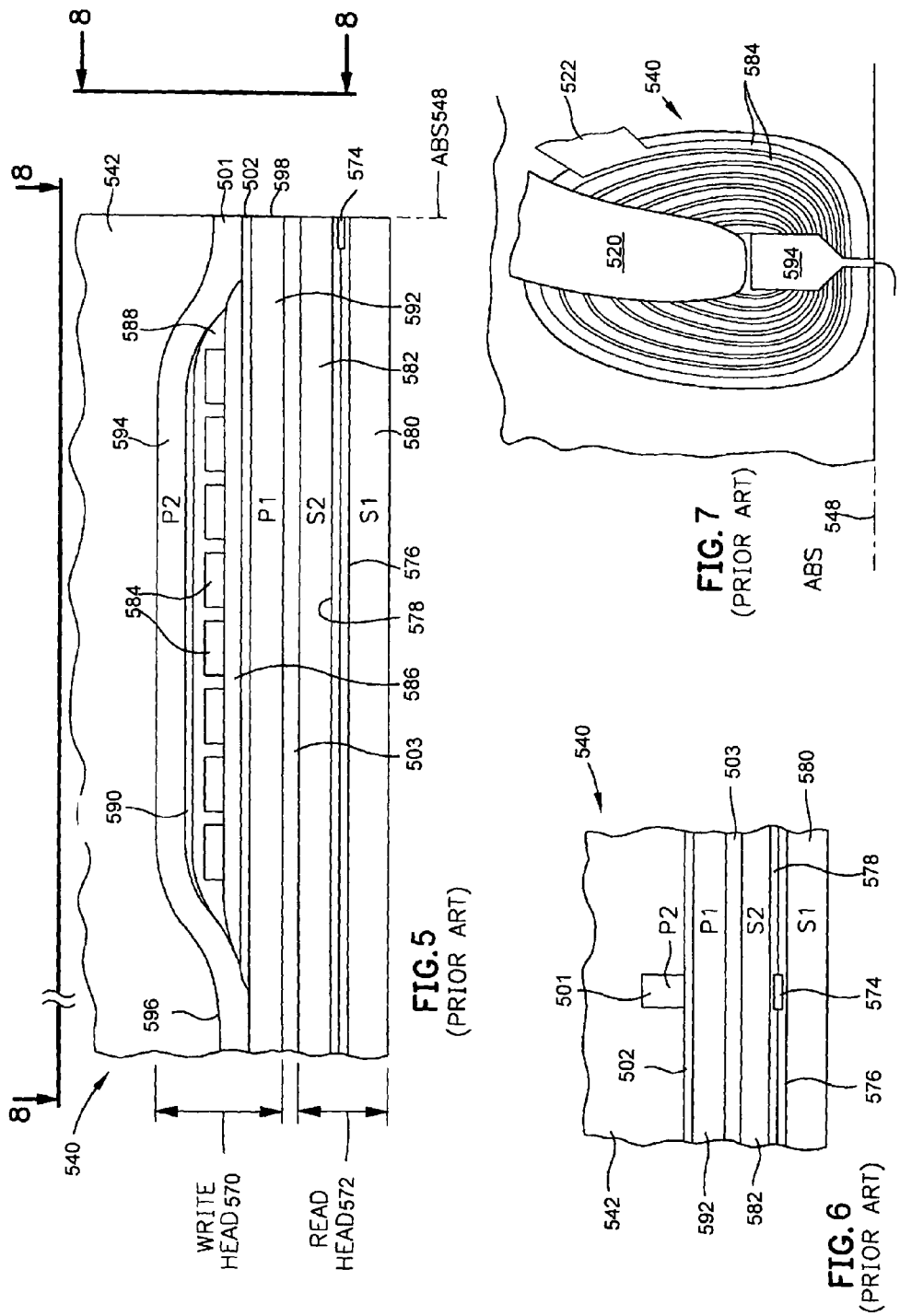
FIG. 5 is a side cross-sectional elevation view of a magnetic head.
FIG. 6 is an air bearing surface (ABS) view of the magnetic head of FIG. 5.
FIG. 7 illustrates the connect leads coupled to the coil for the write pole piece.
Figure 8:
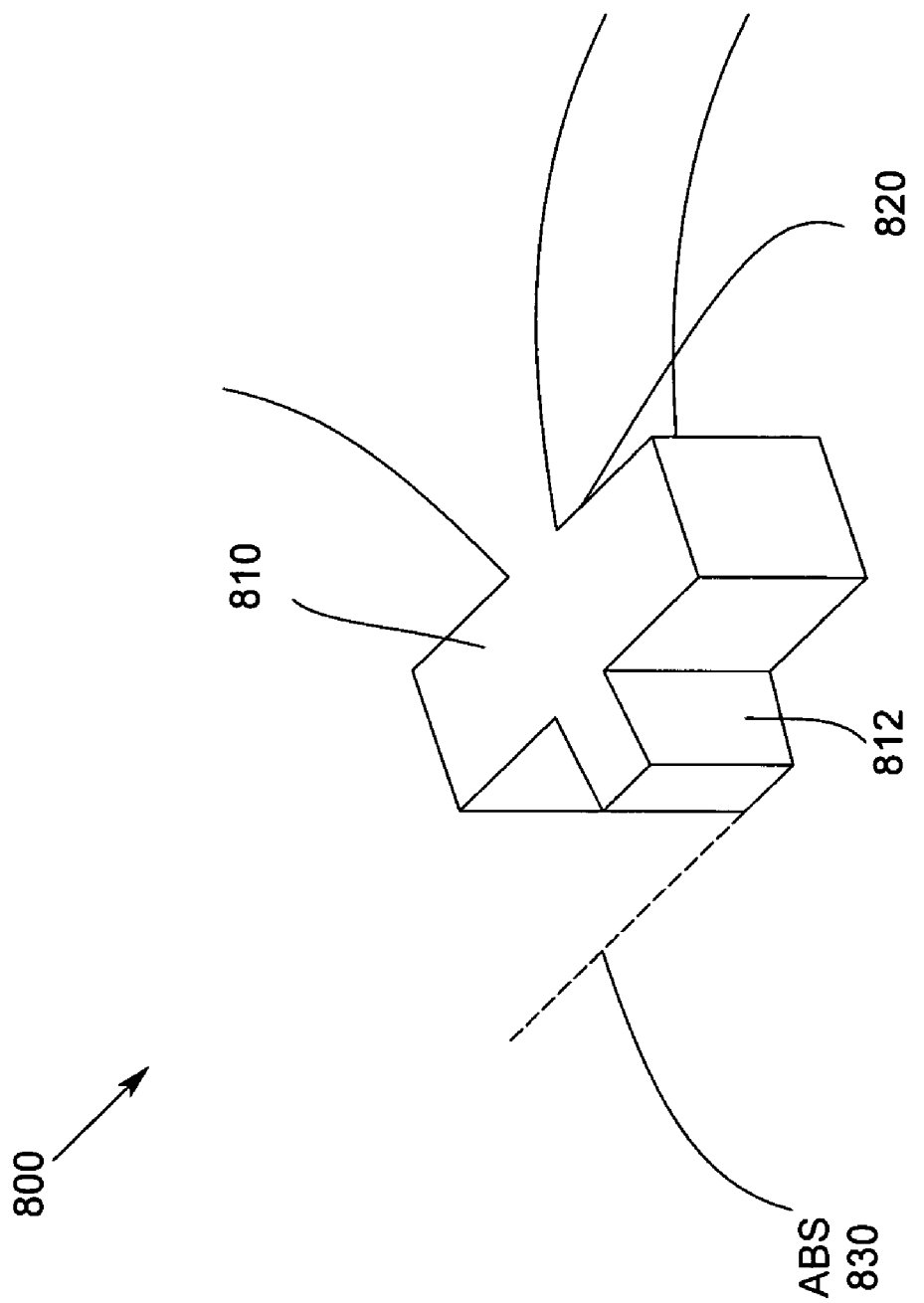
FIG. 8 shows a more detailed view of the pole tip for improving overwrite and/or adjacent track interference according to an embodiment of the present invention.

FIG. 8 shows a more detailed view of the pole tip 800 for improving overwrite and/or adjacent track interference according to an embodiment of the present invention. In FIG. 8, the pole tip 800 is shown having a cross-shaped structure including a transverse section 810 and a pedestal 812 extending from the transverse piece 810. A portion of the pole tip region, i.e., the transverse piece 810, is widened to reduce the pole tip reluctance and to enhance the writer efficiency. Further, the improved stress anisotropic would further improve the permeability and pole tip reluctance. The flare point 820 is not brought closer to the air bearing surface (ABS) 830 to maintain the saturation away from the ABS 830 thereby preventing any adverse effect on the fringing field.

The transverse piece 810 of the cross pole tip 800 is widened at the flare 820. For example, the transverse piece 810 of the cross pole tip region may be eight times wider than the pedestal 812 and at the point of the flare 820. Another way to look at the widening of the transverse piece 810 of the cross pole tip 800 is the increase provided by the widening of the transverse piece 810. For example, the widening of the transverse piece 810 of the cross pole tip 800 may represent 65% of the pole tip 800 and may be widened 55-440%. However, those skilled in the art will recognize that the dimensions of the cross pole tip region of the present invention are not meant to be limited to the above examples. Rather, the dimensions of the cross pole tip region of the present invention may be tailored to provide the desired improvement in overwrite and/or adjacent track interference.

Figure 9:
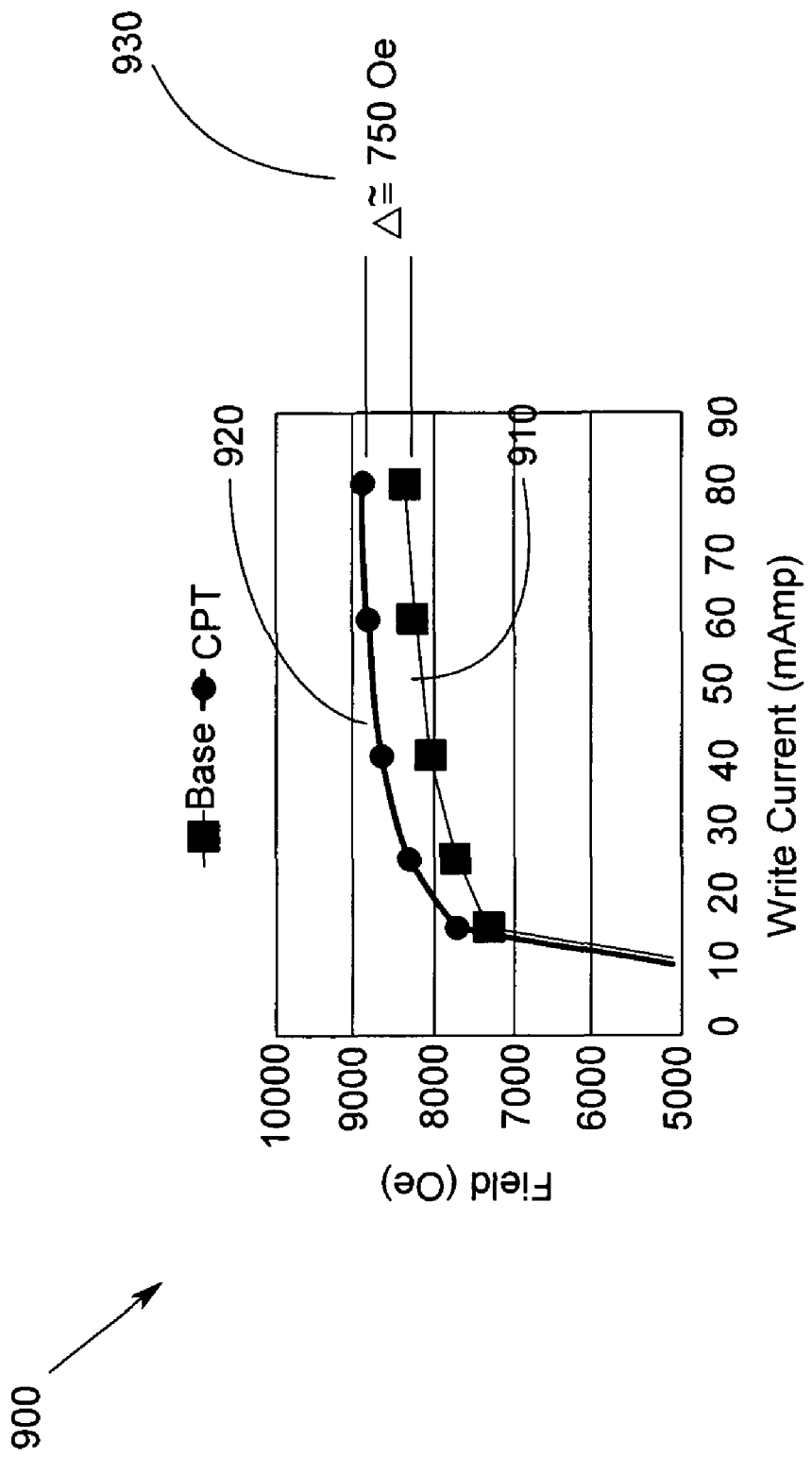
FIG. 9 shows the saturation curve of the base pole tip and the cross pole tip structure according to an embodiment of the present invention.

FIG. 9 shows the saturation curve 900 of the base pole tip 910 and the cross pole tip structure 920 according to an embodiment of the present invention. As can be seen, the cross pole tip structure 920 provides a substantial increase in the on track writing field, e.g., approximately 750 Oe 930 at a given write current. The writer efficiency is also improved with the pole tip structure 920, e.g., it only needs 20 mAmp write current to reach 8000 Oe on track writing field. The table below demonstrates the widening of the transverse piece reduces the fringing field will providing a desired overwrite. For example, the widened transverse piece reduces the saturation on the first pole pedestal and therefore helps to concentrate the flux to the down track, which reduces the fringing field of 3280 Oe by 250 Oe to 3030 Oe at a given OW.

TABLE 1

| Planar Yoke Version<br>P2B = 180 nm,<br>WGAP = 800 nm | OW | Fringing | Fringing at<br>22 dB OW |
|---|---|---|---|
| Base (W/O Cross pole tip) | 20 dB | 3030 | 3280 |
| P2 Cross pole tip | 23 dB | 3160 | 3030 |

Figure 10:
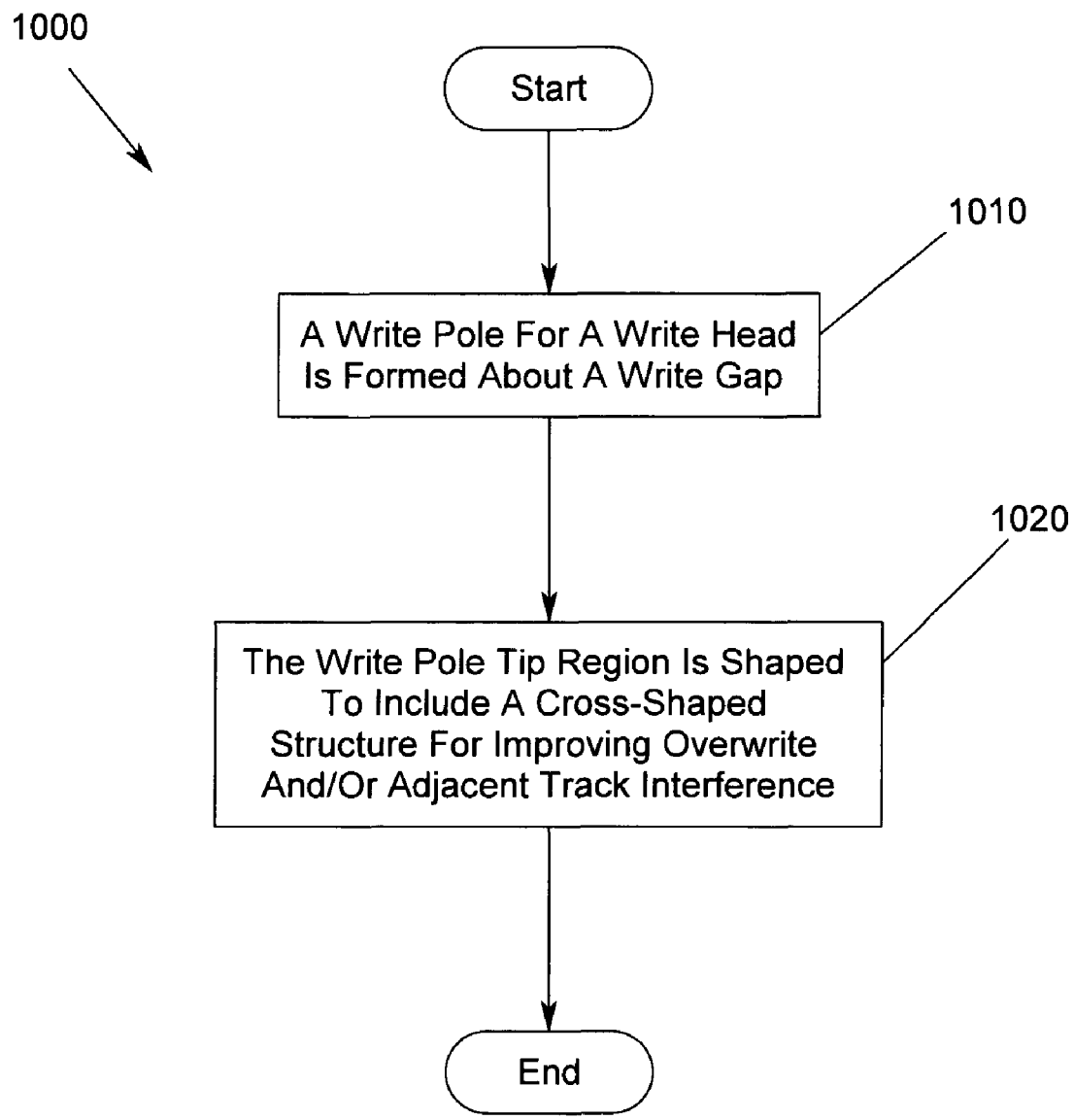
FIG. 10 is a flow chart showing the method for providing a write head with an improved pole tip to improve overwrite and/or adjacent track interference according to an embodiment of the present invention.

FIG. 10 is a flow chart 1000 showing the method for providing a write head with an improved pole tip to improve overwrite and/or adjacent track interference according to an embodiment of the present invention. In FIG. 10, a write pole for a write head is formed about a write gap 1010. The write pole tip region is shaped to include a cross-shaped structure for improving overwrite and/or adjacent track interference 1020.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A write head comprising:
a first write pole; and
a second write pole separated from the first write pole by a write gap;
wherein one of the first write pole and the second write pole comprises a transverse piece formed proximate to a flare point and a pole tip extending from the transverse piece and terminating proximate to an air bearing surface, the pole tip having a first width defining a track width for the write head, and the transverse piece having a second width substantially greater than the first width.

2. The write head of claim 1 wherein the second width is selected to provide a desired overwrite and fringing field magnitude.

3. The write head of claim 1 wherein the flare point has a width substantially equal to the first width.

4. The write head of claim 1 wherein the transverse piece is disposed a predetermined distance from the air bearing surface and the second width is selected to reduce pole tip reluctance and to enhance efficiency of writing to a magnetic recording medium.

5. The write head of claim 1 wherein the transverse piece provides improved stress anisotropy for enhancing permeability and pole tip reluctance.

6. The write head of claim 1 wherein the transverse piece and the pole tip define a pole tip region, the transverse piece comprising a greater percentage of the volume of the pole tip region than said pole tip.

7. The write head of claim 6 wherein the transverse piece accounts for approximately 65% of the volume of the pole tip region.

8. The write head of claim 1 wherein the second width is greater than the first width by an amount in the range from approximately 55% to approximately 440%.

9. The write head of claim 1 wherein the transverse piece provides an increase in a fringing field that is tailored by selecting a value of the second width that reduces the fringing field and provides a desired overwrite.

10. A magnetic storage system comprising:
a magnetic storage medium having a plurality of tracks for recording of data; and
a magnetic sensor maintained in a closely spaced position relative to the magnetic storage medium during relative motion between the magnetic sensor and the magnetic storage medium, the magnetic sensor further comprising:
a write head including a pair of write poles separated by a write gap, one of the pair of write poles comprising a pole piece layer having a transverse piece and a pole tip extending from the transverse piece toward an air bearing, the pole tip having a width defining a track width for the write head, the pole tip width being less than the transverse piece width, said portion of said pole piece layer engaging the transverse piece opposite from the pole tip having a width less than the transverse piece width.

11. The magnetic storage system of claim 10 wherein the transverse piece width is selected to provide a desired overwrite and fringing field magnitude.

12. The magnetic storage system of claim 10 wherein the portion of the pole piece layer engaging the transverse piece opposite from the pole tip is a flare point having a width substantially equal to the pole tip width and wherein the pole piece layer widens as the distance inward from the transverse piece increases.

13. The magnetic storage system of claim 10 wherein the transverse piece is disposed a predetermined distance inward from the air bearing surface and the transverse piece width is selected to reduce pole tip reluctance and to enhance efficiency of writing to a magnetic recording medium.

14. The magnetic storage system of claim 10 wherein the transverse piece provides improved stress anisotropy for enhancing permeability and pole tip reluctance.

15. The magnetic storage system of claim 10 wherein the pole piece layer includes a flare point proximate to the transverse piece, the pole piece layer increasing in width in a direction leading away from the transverse piece to maintain the saturation away from the air bearing surface to prevent any adverse effect on a fringing field.

16. The magnetic storage system of claim 10 wherein the transverse piece has a volume that is greater than the volume of the pole tip.

17. The magnetic storage system of claim 10 wherein the transverse piece width is wider than the pole tip width by an amount in the range from approximately 55% to 440%.

18. The magnetic storage system of claim 10 wherein the transverse piece provides an increase in a fringing field that is tailored by selecting a transverse piece width that reduces the fringing field and provides a desired overwrite.

19. A method for providing a write head with an improved pole tip to improve overwrite and/or adjacent track interference, said method comprising:
forming, about a write gap, a write pole for a write head comprising a pole piece layer;
shaping the pole piece layer to include a transverse piece defined by a first width and disposed a predetermined distance from an air bearing surface; and
shaping the end of the pole piece layer proximate to the air bearing surface into a pole tip extending from a face of the transverse piece toward the air bearing surface, the pole tip having a second width that is substantially narrower than the first width, the second width defining the track width of the write head.

20. The method of claim 19 wherein shaping the pole piece layer to include a transverse piece further comprises forming the transverse piece with the first width being selected to provide a desired overwrite and fringing field magnitude.

21. The method of claim 19 further comprising forming a flare point in the pole piece layer, the flare point being recessed from the transverse piece; and
   increasing the width of the pole piece layer beginning at the flare point in a direction leading away from the transverse piece.

22. The method of claim 19 wherein shaping the pole piece layer to include a transverse piece further comprises shaping the transverse piece with the first width being selected to reduce pole tip reluctance and for enhancing efficiency of writing to a magnetic recording medium.

23. The method of claim 19 further comprising forming a flare point where the pole piece layer becomes wider in a direction leading away from the transverse piece to maintain the saturation away from the air bearing surface to prevent any adverse effect on the fringing field.

24. The method of claim 19 wherein shaping the end of the pole piece layer further comprises forming the pole tip with a volume less than the volume of the transverse piece.

25. The method of claim 19 wherein shaping the pole piece layer further comprises forming the transverse piece with the first width being wider than the second width by an amount in the range from approximately 55% to 440%.

26. The method of claim 19 wherein the shaping the planar pole piece layer further comprises forming a transverse piece with the first width chosen to be greater than said second width to reduce a fringing field and to provide a desired overwrite.

27. A write head comprising:
   a first write pole;
   a second write pole; and
   a write gap between the first write pole and the second write pole;
   one of the first write pole and second write pole comprising a means for reducing a fringing field and providing a desired overwrite.

28. A magnetic storage system comprising:
   means for storing data;
   means, maintained in a closely spaced position relative to the means for storing, for reading and writing data on the means for storing during relative motion between the means for reading and writing data and the means for storing data, the means for reading and writing further comprising:
   means for writing data on the head including a means for reducing a fringing field and providing a desired overwrite; and
   means, coupled to the means for writing data, for providing a magnetic gap.

* * * * *